United States Patent
Yoon et al.

(10) Patent No.: US 9,372,357 B2
(45) Date of Patent: Jun. 21, 2016

(54) LIQUID CRYSTAL DISPLAY

(71) Applicant: SAMSUNG DISPLAY CO., LTD., Yongin, Gyeonggi-Do (KR)

(72) Inventors: Hyun Sik Yoon, Seoul (KR); Min-Gwan Hyun, Yongin-si (KR); Wan-Sang Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 37 days.

(21) Appl. No.: 14/539,900

(22) Filed: Nov. 12, 2014

(65) Prior Publication Data

US 2015/0355495 A1   Dec. 10, 2015

(30) Foreign Application Priority Data

Jun. 10, 2014   (KR) .................. 10-2014-0070249

(51) Int. Cl.
*G02F 1/1333* (2006.01)
*G02F 1/1343* (2006.01)

(52) U.S. Cl.
CPC ............ *G02F 1/133308* (2013.01); *G02F 2001/133317* (2013.01); *G02F 2201/46* (2013.01); *G02F 2201/503* (2013.01)

(58) Field of Classification Search
CPC ............. G02F 1/133308; G02F 1/133608; G02F 1/13452; G02F 2001/133317; G02F 1/133615; G02F 1/134363; G02F 1/133707; G02F 1/136213; G02F 2001/134372; G02F 1/136286

USPC ..................................... 349/58, 141
See application file for complete search history.

(56) References Cited

U.S. PATENT DOCUMENTS

| 8,319,912 | B2 | 11/2012 | Byeon et al. |
| 8,421,951 | B1 | 4/2013 | Wang et al. |
| 8,441,597 | B2 | 5/2013 | Kim |
| 8,477,257 | B2 * | 7/2013 | Nakano ............. G02F 1/133308 349/58 |
| 2013/0242225 | A1 | 9/2013 | Yu |
| 2014/0056031 | A1 * | 2/2014 | Lee ...................... G02B 6/0093 362/633 |

FOREIGN PATENT DOCUMENTS

| JP | 2005-070659 A | 3/2005 |
| JP | 2005-070662 A | 3/2005 |
| JP | 2006-018037 A | 1/2006 |
| JP | 2009-063647 A | 3/2009 |
| JP | 2011-216274 A | 10/2011 |
| KR | 10-2005-0053112 A | 6/2005 |

* cited by examiner

*Primary Examiner* — Mike Qi
(74) *Attorney, Agent, or Firm* — Lewis Roca Rothgerber Christie LLP

(57) ABSTRACT

An exemplary embodiment of the present invention provides a liquid crystal display including: a liquid crystal panel configured to display an image; a light unit configured to supply light to the liquid crystal panel; and a bottom chassis configured to accommodate the light unit and the liquid crystal panel, wherein the bottom chassis includes an accommodator configured to accommodate the light unit and the liquid crystal panel, and a flange formed outside the accommodator, and the flange is formed at the same position as a bottom surface of the bottom chassis.

20 Claims, 22 Drawing Sheets

LIQUID CRYSTAL DISPLAY

CROSS-REFERENCE TO RELATED APPLICATION

This application claims priority to and the benefit of Korean Patent Application No. 10-2014-0070249, filed in the Korean Intellectual Property Office on Jun. 10, 2014, the entire content of which is incorporated herein by reference.

BACKGROUND

1. Field

An aspect of an embodiment of the present invention relates to a liquid crystal display.

2. Description of the Related Art

With the rapidly developing semiconductor technology, demand for a small light-weight liquid crystal display having improved performance has recently explosively increased.

The liquid crystal display, which has been in the spotlight in recent years, has advantages such as a reduced size, a light weight, and low power consumption such that it is drawing attention as a substitute which may overcome drawbacks of a cathode ray tube (CRT) of the related art. Currently, the liquid crystal display is mounted in almost all information processing equipment which requires the display device.

A conventional liquid crystal display is a non-emissive type (kind) of display device in which the alignment of liquid crystal molecules is changed by applying a voltage to specifically align liquid crystal molecules and display images using (utilizing) optical characteristic changes, which are caused by the change of the alignment of the liquid crystal molecules, such as birefringence, optical rotary power, dichroism, and optical scattering.

The liquid crystal display includes a liquid crystal panel and a backlight unit for supplying light thereto, and a bottom chassis is provided to couple and secure the liquid crystal panel and the backlight unit thereto. This bottom chassis is coupled with a' constituent element that forms an outer appearance of the liquid crystal display.

The above information disclosed in this Background section is only for enhancement of understanding of the background of the invention and therefore it may contain information that does not form the prior art that is already known in this country to a person of ordinary skill in the art.

SUMMARY

An aspect of an embodiment of the present invention has been made in an effort to provide a display device having advantages of being capable of preventing or reducing light leakage caused by compression in a liquid crystal panel without transferring a pressure that is applied in a coupling process of a bottom chassis with a constituent element to a liquid crystal panel by forming a flange of the bottom chassis at a lower portion of the bottom chassis.

An exemplary embodiment of the present invention provides a liquid crystal display including: a liquid crystal panel configured to display an image; a light unit configured to supply light to the liquid crystal panel; and a bottom chassis configured to accommodate the light unit and the liquid crystal panel, wherein the bottom chassis includes an accommodator configured to accommodate the light unit and the liquid crystal panel, and a flange formed outside the accommodator, and the flange is formed at the same position as a bottom surface of the bottom chassis.

The liquid crystal display may further include a bottom frame or a set bracket configured to be coupled with the bottom chassis, and the flange may be coupled with the bottom frame or the set bracket of the liquid crystal display.

The flange and the accommodator of the bottom chassis may be formed by using a single process, and may be connected to each other without being separated from each other.

The bottom chassis may have a quadrangular shape, and the flange may be formed at each edge of the bottom chassis.

The flange may include four flanges in the liquid crystal display.

A groove may be formed at a portion of the bottom frame to correspond to the accommodator of the bottom chassis, and a thickness of the bottom frame at (or corresponding to) the accommodator of the bottom chassis may be lower than a thickness of the bottom frame at (or corresponding to) the flange of the bottom chassis.

A groove may be formed at a portion of the set bracket to correspond to the accommodator of the bottom chassis, and a thickness of the set bracket at (or corresponding to) the accommodator of the bottom chassis may be lower than a thickness of the set bracket at (or corresponding to) the flange of the bottom chassis.

The groove may have the same shape of that of the liquid crystal panel.

The groove may have a quadrangular shape.

The liquid crystal display may further include a mold frame formed in the inside of the accommodator of the bottom chassis.

An empty space may be formed by removing a portion of the mold frame near to the flange of the bottom chassis.

The empty space may have a quadrangular shape.

The number of empty spaces formed by partially removing the mold frame may be the same as the number of flanges.

A coupling hole may be formed at the center of the flange.

The liquid crystal panel may include: an insulating substrate; a gate line disposed on the insulating substrate; and a plurality of pixels disposed on the insulating substrate and including a first field generating electrode and a second field generating electrode overlapping with an insulating layer interposed therebetween, wherein any one of the first field generating electrode and the second field generating electrode has a plurality of cutouts, the plurality of cutouts include a first portion forming a first angle with a reference line forming an angle of 90° with the gate line and a second portion forming a second angle that is different from the first angle with the reference line, and a ratio of a length of the first portion to a length of the cutout is about 80% or more.

A ratio of a length of the second portion to the length of the cutout may be about 6% to about 13%.

The second angle may be larger than the first angle.

The other one of the first field generating electrode and the second field generating electrode may have a flat surface plate shape.

The cutout may further include a third portion forming a third angle that is different from the first angle with the reference line, and a ratio of the length of the third portion to the length of the cutout may be about 10% or less.

The third angle may be larger than the first angle.

As such, as the flange of the bottom chassis is formed at the lower portion of the bottom chassis in the liquid crystal display according to the exemplary embodiment of the present invention, the pressure is not transferred to the liquid crystal panel in the coupling process, thereby preventing or reducing light leakage caused by compression in the liquid crystal panel. Further, a stress-absorbing groove can be formed at the bottom frame that is coupled with the mold frame or the bottom chassis, thereby buffering the stress that is generated in the coupling process.

BRIEF DESCRIPTION OF THE DRAWINGS

FIG. 21 and FIG. 22 are enlarged views respectively illustrating a portion indicated by "A" in FIG. 20, in which FIG. 21 illustrates the flange of the liquid crystal panel according to a comparative embodiment of the present invention, and FIG. 22 illustrates the flange of the liquid crystal panel according to the exemplary embodiment of the present invention.

DETAILED DESCRIPTION

Figure 1:
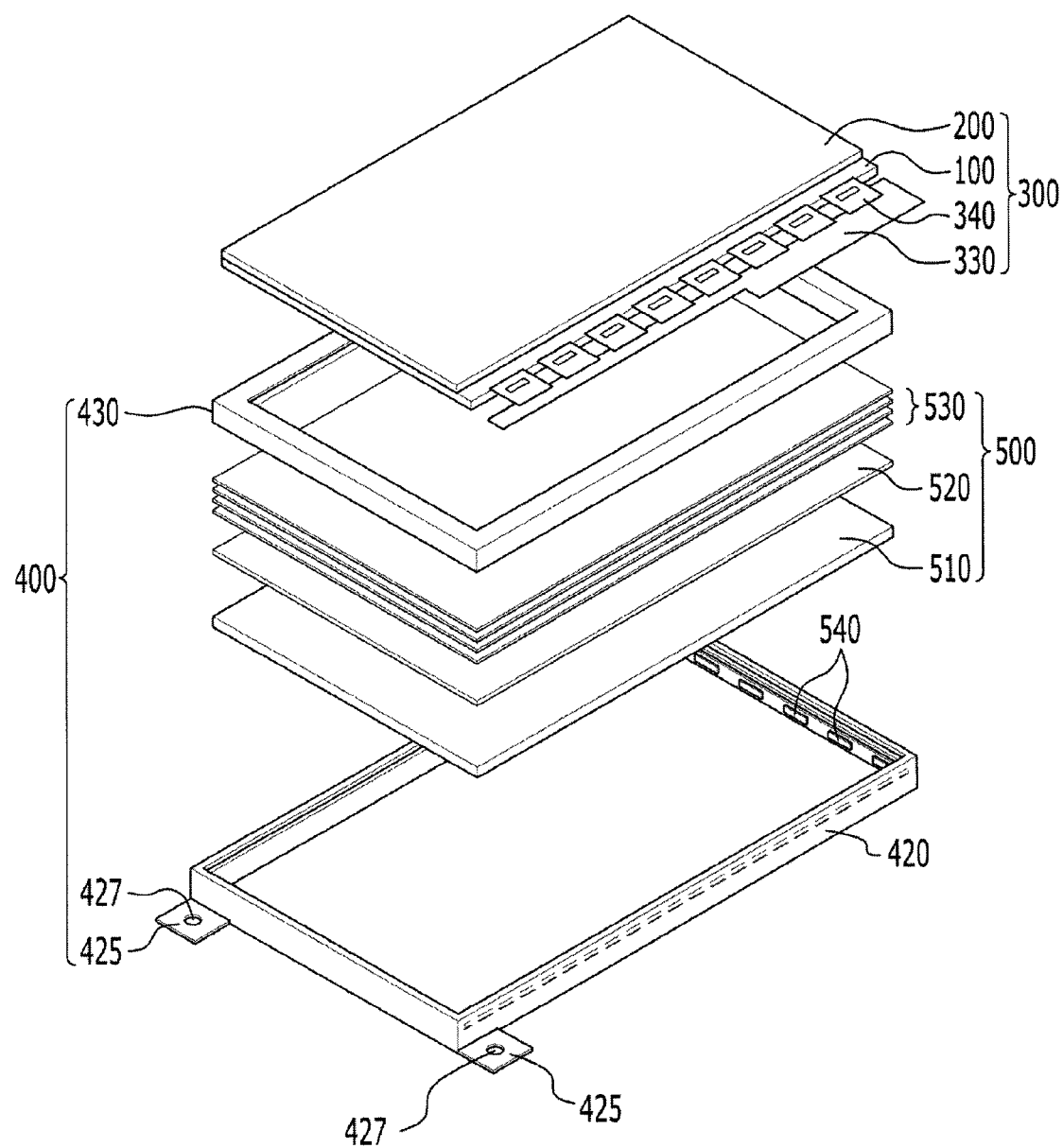
FIG. 1 is an exploded perspective view showing a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or one or more intervening elements may also be present. In contrast, when an element is referred to as being "directly on" another element, there are no intervening elements present. Also, it will be understood that when an element is referred to as being "connected to", "coupled to", or "adjacent to" another element, it can be directly connected to, coupled to, or adjacent to the other element, or one or more intervening elements or layers may be present. In contrast, when an element is referred to as being "directly connected to", "directly coupled to", or "immediately adjacent to" another element, there are no intervening elements present. Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present. It will be further understood that the terms "comprises or includes" and/or "comprising or including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

A liquid crystal display and a manufacturing method according to an exemplary embodiment of the present invention will now be described with reference to the accompanying drawings.

Hereinafter, a liquid crystal display according to an exemplary embodiment of the present invention will be described in more detail with reference to FIG. 1 and FIG. 2.

FIG. 1 is an exploded perspective view showing the liquid crystal display according to the exemplary embodiment of the present invention.

Referring to FIG. 1, the liquid crystal display according to the exemplary embodiment of the present invention includes a backlight unit 500 for supplying light, a liquid crystal panel 300 for displaying an image in response to the light, and an accommodating unit 400 for securing and supporting the back light unit 500 and the liquid crystal panel 300. The accommodating unit 400 includes a mold frame 430 and a bottom chassis 420, and may further include a top chassis, a set bracket, and the like, which are not shown in FIG. 1. A detailed structure of the liquid crystal display will be described later.

Now, the backlight unit 500 included in the liquid crystal display according to the present exemplary embodiment will be described.

The backlight unit 500 includes a plurality of light emitting diodes 540 for supplying light to the liquid crystal panel 300, and the light emitting diodes 540 are arranged in parallel on a side surface of the bottom chassis 420 to emit a large amount of light.

A structure of the liquid crystal display shown in FIG. 1 is only for exemplarily describing the exemplary embodiment, and the exemplary embodiment is not limited thereto. Accordingly, this is also true of liquid crystal displays having different structures, and the light emitting diodes may be arranged in various suitable shapes. For example, the light emitting diodes 540 may be disposed in the bottom chassis 420 as a direct type (kind) instead of an edge type (kind) as shown in FIG. 1, or at any one side or at multiple sides. Alternatively, the light emitting diodes 540 may be disposed at one side surface thereof or at multiple side surfaces thereof. Further alternatively, various suitable types (kinds) of lamps such as cold cathode fluorescent lamps (CCFLs) may be disposed instead of the light emitting diodes 540.

The backlight unit 500 is accommodated in the bottom chassis 420 to be secured thereto, and includes: the light emitting diodes 540 serving as backlights arranged and secured at a side surface of the bottom chassis 420 separately at a set or predetermined distance from each other; a reflective sheet 510 for reflecting light emitted from the light emitting diodes 540; a light guide 520 for converting point light generated from the light emitting diodes 540 into surface light; and an optical sheet 530 for obtaining luminance characteristics of light emitted from the light emitting diodes 540 to supply light to the liquid crystal panel 300.

The optical sheet 530 includes a diffuser sheet 531 for diffusing light, a light collecting sheet 532 for collecting the diffused light, and a protecting sheet 533 for protecting a light collecting pattern formed on the light collecting sheet 532.

Next, the liquid crystal panel 300 according to an exemplary embodiment of the present invention will be described with reference to FIG. 1 to FIG. 5.

The liquid crystal panel (or liquid crystal display panel) 300 includes a liquid crystal member, a tape carrier package (TCP) 340, and a printed circuit board (PCB) 330. The liquid crystal member includes a lower panel 100 including a plurality of thin film transistors (TFTs), an upper panel 200 located above the lower panel 100, and a liquid crystal which is injected into a space therebetween. Polarizers 310 and 320 are respectively attached on a top surface of the upper panel 200 and a bottom surface of the lower panel 100 to linearly polarize visible rays supplied from the backlight unit 500.

Next, the lower panel 100 and the upper panel 200 of the liquid crystal panel 300 will be described with reference to FIG. 2 to FIG. 5.

First, a liquid crystal display according to an exemplary embodiment of the present invention will be described with reference to FIG. 2 and FIG. 3. FIG. 2 is a layout view of a liquid crystal display according to an exemplary embodiment of the present invention, and FIG. 3 is a cross-sectional view of the liquid crystal display of FIG. 1, taken along the line III-III.

First, the lower panel 100 will be described.

A gate conductor including a gate line 121 is formed on an insulating substrate 110 formed of transparent glass, plastics, or the like.

The gate line 121 includes a gate electrode 124, and a wide end portion for connection with another layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 formed of a silicon nitride (SiNx), a silicon oxide (SiOx), or the like is formed on the gate line (e.g., gate conductor) 121. However, the gate insulating layer 140 may have a multilayered structure including at least two insulating layers having different physical properties.

A semiconductor 154 made of amorphous silicon, polysilicon, or the like is formed on the gate insulating layer 140. The semiconductor 154 may include the oxide semiconductor.

Ohmic contacts 163 and 165 are formed on the semiconductor 154. The ohmic contacts 163 and 165 may be made of a material such as n+ hydrogenated amorphous silicon with which an n-type impurity such as phosphorus is doped at a high concentration, or of a silicide. The ohmic contact 163 and 165 may form a pair to be disposed on the semiconductor 154. In the case where the semiconductor 154 is the oxide semiconductor, the ohmic contacts 163 and 165 may be omitted.

A data conductor including a data line 171 including a source electrode 173 and a drain electrode 175 is formed on the ohmic contacts 163 and 165 and the gate insulating layer 140.

The data line 171 includes a wide end portion for connection with another layer or an external driving circuit. The data line 171 transports a data signal and substantially (or mainly) extends along a vertical direction to cross the gate line 121.

In this case, the data line 171 may have a first bent portion having a bent shape in order to obtain maximum transmittance of the liquid crystal display, and the bent portions may meet each other in a middle region of the pixel region to form a V shape. A second bent portion that is bent so as to form a set or predetermined angle with the first bent portion may be further included in the middle region of the pixel region.

The first bent portion of the data line 171 may be bent so as to form an angle of about 7° with a vertical reference line y (a reference line extending along a y direction) forming a 90° angle with an extension direction (x direction) of the gate line 121. The second bent portion disposed in the middle region of the pixel region may be further bent so as to form an angle of about 7° to about 15° with the first bent portion.

The source electrode 173 is a portion of the data line 171, and is disposed on the same line as the data line 171. The drain electrode 175 is formed so as to extend in parallel with the source electrode 173. The drain electrode 175 is formed so as to extend in parallel with the source electrode 173.

The gate electrode 124, the source electrode 173, and the drain electrode 175 form a thin film transistor (TFT) in conjunction with the semiconductor 154, and a channel of the thin film transistor is formed in the semiconductor 154 between the source electrode 173 and drain electrode 175.

A thin film transistor array panel according to the exemplary embodiment of the present invention includes the source electrode 173 positioned on the same line as the data line 171 and the drain electrode 175 extending in parallel with the data line 171, and as a result, even though an area occupied by the data conductor is not increased, a width of the thin film transistor may be increased, thereby increasing an aperture ratio of the liquid crystal display.

Here, in one embodiment, the data line 171 and the drain electrode 175 is made of refractory metal such as molybdenum, chromium, tantalum, and titanium, or an alloy thereof, and may have a multilayered structure including a refractory metal layer and a low resistance conductive layer. Examples of the multilayered structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer. However, the data line 171 and the drain electrode 175 may be made of various suitable metals or conductors in addition to this. The width of the data line 171 may be about 3.5 µm±0.75.

A first passivation layer 180n is disposed on exposed portions of the data line (e.g., conductor) 171 and the source and drain electrodes (e.g., conductors) 173 and 175, the gate insulating layer 140, and the semiconductor 154. The first passivation layer 180n may be formed of an organic insulating material, an inorganic insulating material, or the like.

A second passivation layer 180q is disposed on the first passivation layer 180n. The second passivation layer 180q may be omitted. The second passivation layer 180y may be a color filter. In the case where the second passivation layer 180q is the color filter, the second passivation layer 180y may intrinsically display any one of primary colors, and examples of the primary colors may include three primary colors such as red, green, and blue, yellow, cyan, and magenta, or the like. Although not shown in the drawings, the color filter may further include a color filter displaying a mixed color of the primary colors or white in addition to the primary colors.

A common electrode 270 is formed on the second passivation layer 180q. The common electrode 270 may have a surface shape and be formed on the entire surface of the insulating substrate 110 to have a whole plate shape, and may have an opening disposed in a region corresponding to the circumference of the drain electrode 175. That is, the common electrode 270 may have a flat plate shape.

Common electrodes 270 disposed in adjacent pixels may be connected to each other to receive a common voltage having a set or predetermined magnitude supplied from the outside of the display region.

A third passivation layer 180z is disposed on the common electrode 270. The third passivation layer 180z may be made of an organic insulating material, an inorganic insulating material, or the like.

A pixel electrode 191 is formed on the third passivation layer 180z. The pixel electrode 191 includes a curved edge that is almost parallel to the first bent portion and the second bent portion of the data line 171. The pixel electrode 191 has a plurality of first cutouts 92, and includes a plurality of first slit electrodes 192 defined by the plurality of first cutouts 92.

A second contact hole 185 exposing the drain electrode 175 is formed in the first passivation layer 180n, the second passivation layer 180q, and the third passivation layer 180z. The pixel electrode 191 is physically and electrically connected to the drain electrode 175 through the second contact hole 185 to receive a voltage from the drain electrode 175.

Although not illustrated, an alignment layer is coated on the pixel electrode 191 and the third passivation layer 180z, and the alignment layer may be a horizontal alignment layer and be rubbed in a set or predetermined direction. However, in a liquid crystal display in accordance with another exemplary embodiment of the present invention, the alignment layer includes a photoreactive material to be photoaligned.

Next, the upper panel 200 will be described.

A light blocking member 220 is formed on an insulation substrate 210 made of transparent glass or the like. The light blocking member 220 is also referred to as a black matrix and prevents or reduces light leakage.

A plurality of color filters 230 are also formed on the insulation substrate 210. When the second passivation layer 180q of the lower panel 100 is the color filter, the color filter 230 of the upper panel 200 may be omitted. Also, the light blocking member 220 of the upper panel 200 may be formed in the lower panel 100.

An overcoat 250 is formed on the color filter 230 and the light blocking member 220. The overcoat 250 can be made of an (organic) insulator, and is configured to prevent or protect the color filters 230 from being exposed and to provide a planarized surface. The overcoat 250 can be omitted.

An alignment layer may be disposed on the overcoat 250.

A liquid crystal layer 3 includes a nematic liquid crystal material having positive dielectric anisotropy. The liquid crystal molecules of the liquid crystal layer 3 are arranged so that a direction of elongated axes of the liquid crystal molecules is parallel to the panels 100 and 200, and have a structure in which the direction is spirally deviated by 90° from a rubbing direction of an alignment layer of the lower panel 100 to the upper panel 200.

The pixel electrode 191 receives the data voltage from the drain electrode 175, and the common electrode 270 receives the common voltage from a common voltage application unit disposed outside the display area.

The pixel electrode 191 and the common electrode 270, which are field generating electrodes, generate an electric field so that liquid crystal molecules of the liquid crystal layer 3 positioned between the two electrodes 191 and 270 rotate in a direction parallel to the direction of the electric field. Polarization of light which passes through the liquid crystal layer varies according to the rotation direction of the liquid crystal molecules determined as described above.

Figure 4:
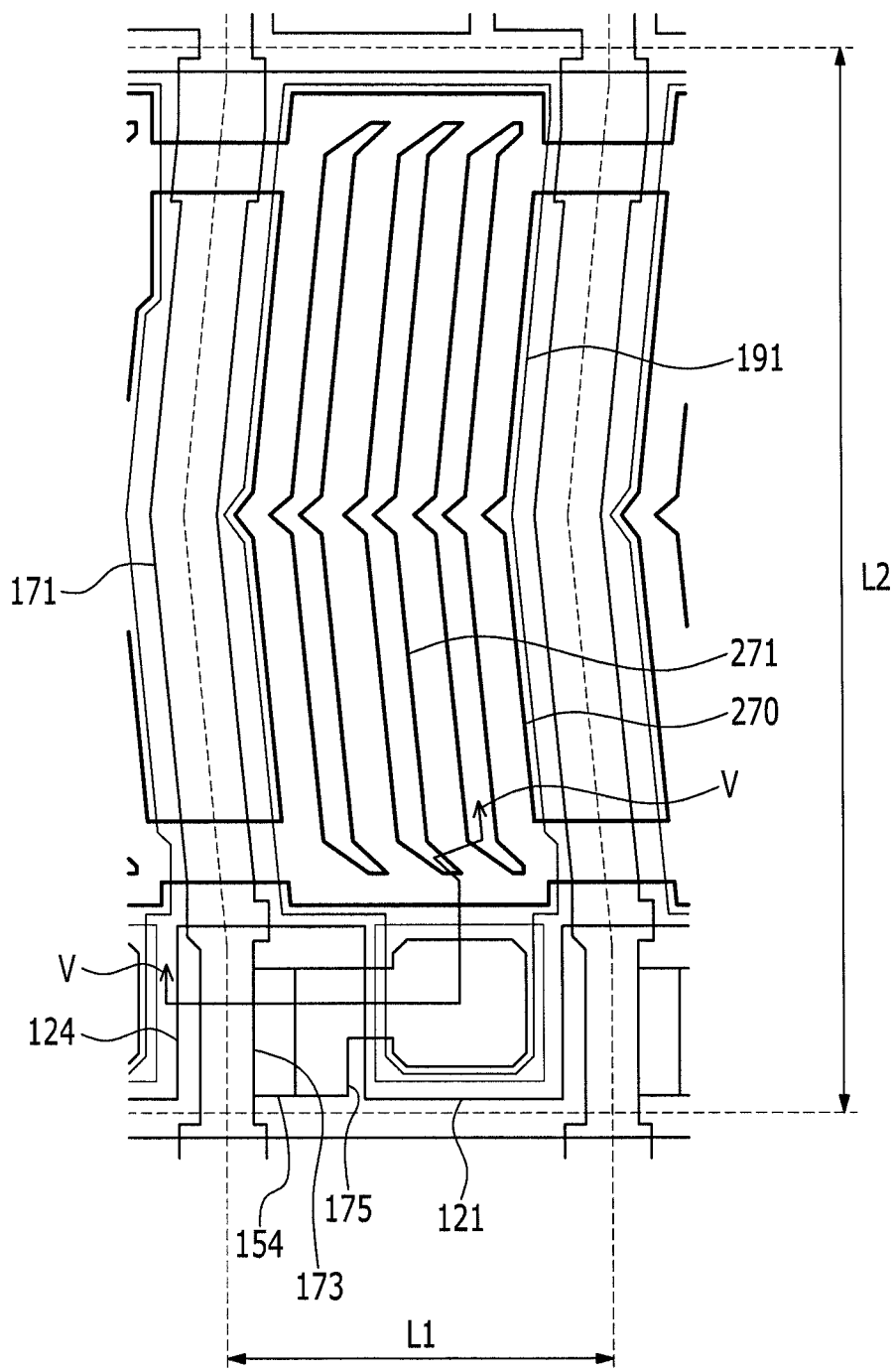
FIG. 4 is a layout view of a liquid crystal display according to an exemplary embodiment of the present invention.

Next, a liquid crystal display according to an exemplary embodiment of the present invention will be described with reference to FIG. 4 to FIG. 5. FIG. 4 is a layout view of a liquid crystal display according to an exemplary embodiment of the present invention, and FIG. 5 is a cross-sectional view of the liquid crystal display according to the exemplary embodiment shown in FIG. 4, taken along the line V-V.

Figure 2:
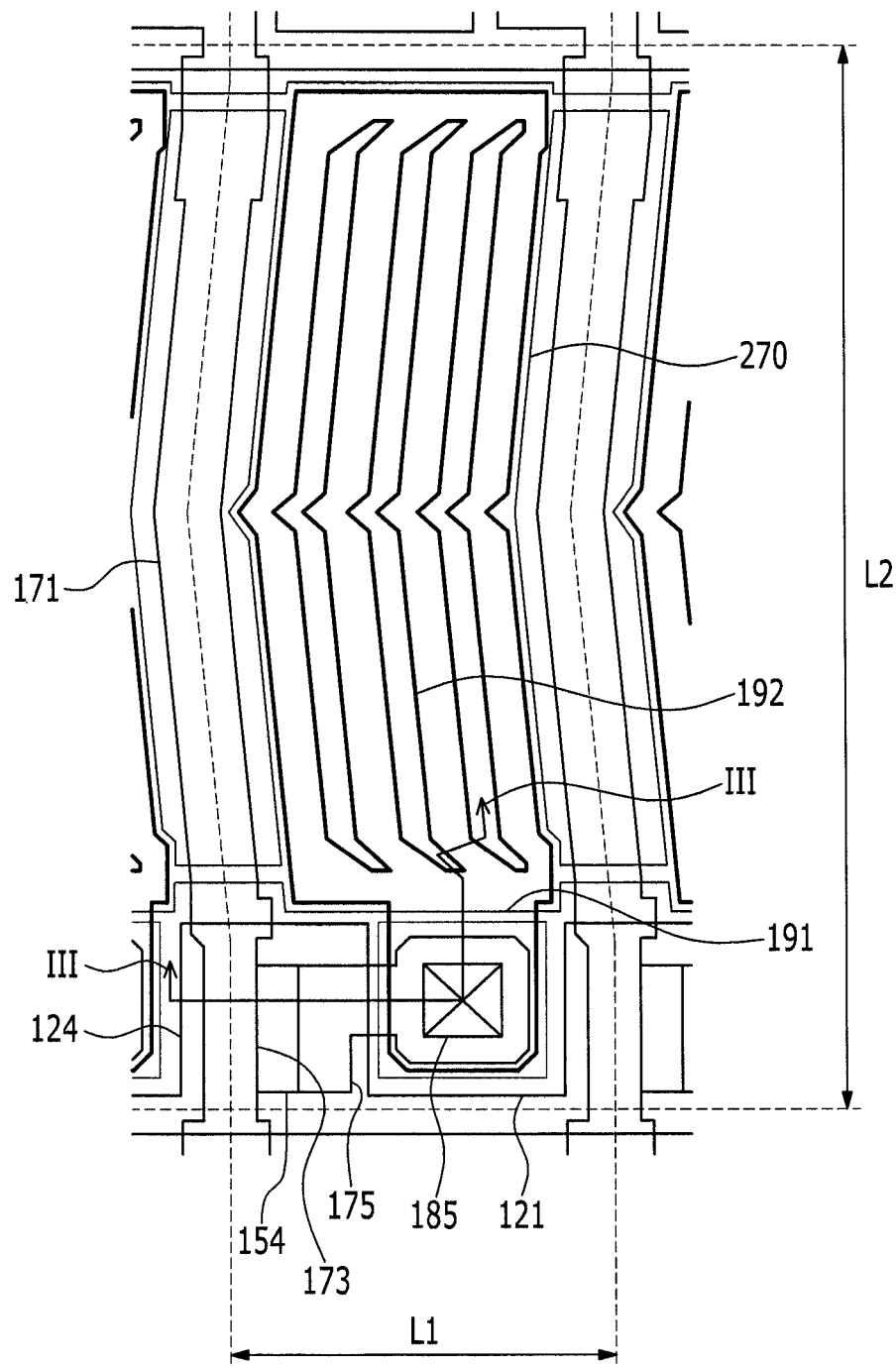
FIG. 2 is a layout view of a liquid crystal display according to an exemplary embodiment of the present invention.
Figure 3:
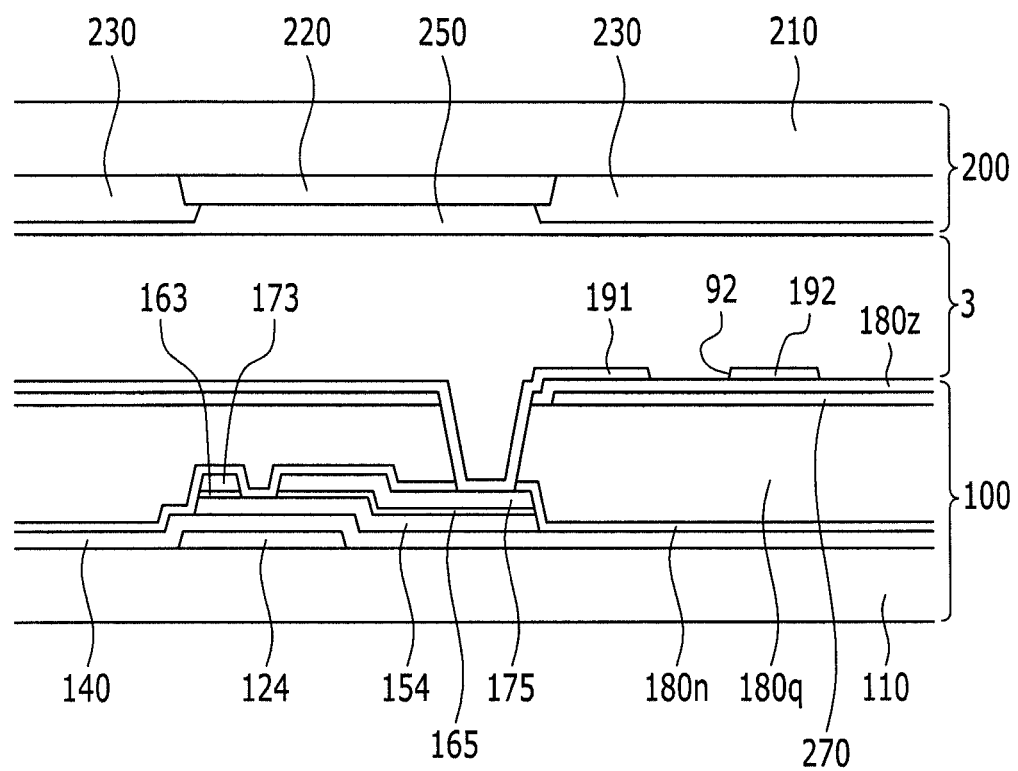
FIG. 3 is a cross-sectional view of the liquid crystal display of FIG. 2, taken along the line III-III.
Figure 5:
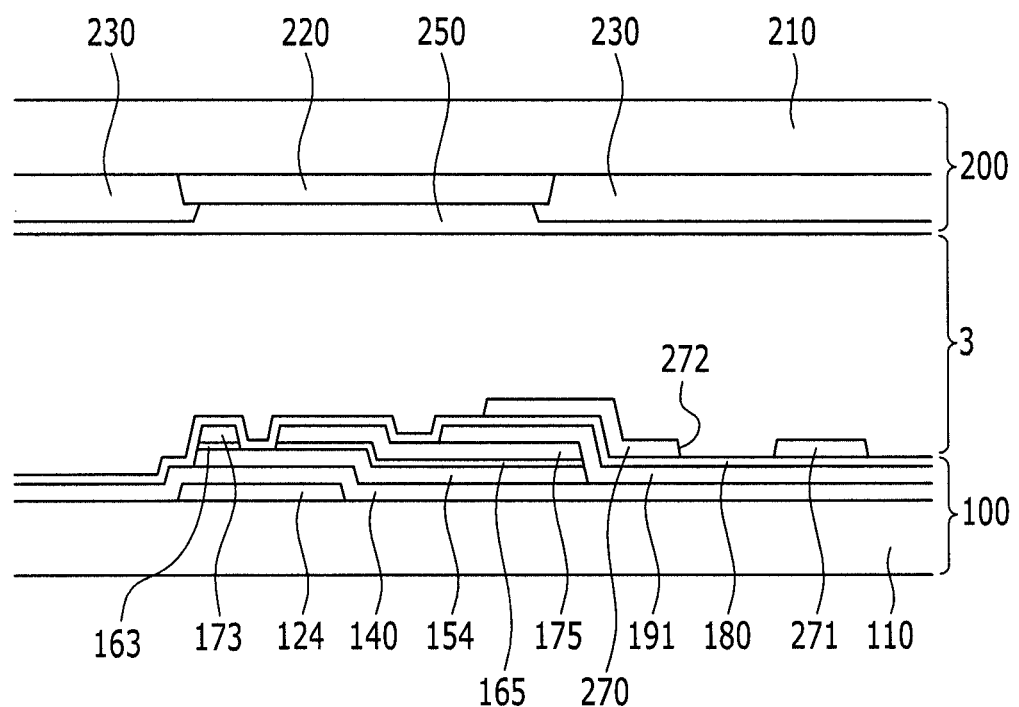
FIG. 5 is a cross-sectional view of the liquid crystal display according to the exemplary embodiment shown in FIG. 4, taken along the line V-V.

Referring to FIG. 4 and FIG. 5, a liquid crystal display according to the present exemplary embodiment is similar to the liquid crystal display according to the exemplary embodiment shown in FIG. 1 and FIG. 2.

Referring to FIG. 4 and FIG. 5, a liquid crystal display according to an exemplary embodiment of the present invention includes a lower panel 100 and an upper panel 200 facing each other, and a liquid crystal layer 3 interposed therebetween.

First, the lower panel 100 will be described.

A gate conductor including a gate line 121 is formed on an insulating substrate 110 formed of transparent glass, plastics, or the like.

A gate insulating layer 140 formed of a silicon nitride (SiNx), a silicon oxide (SiOx), or the like is formed on the gate line (e.g., gate conductor) 121.

A semiconductor 154 is formed on the gate insulating layer 140.

Ohmic contacts 163 and 165 are formed on the semiconductor 154. In the case where the semiconductor 154 is the oxide semiconductor, the ohmic contacts 163 and 165 may be omitted.

A data conductor including a data line 171 including a source electrode 173 and a drain electrode 175 is formed on the ohmic contacts 163 and 165 and the gate insulating layer 140.

A pixel electrode 191 is formed directly on the drain electrode 175. The pixel electrode 191 is disposed in one pixel region to have a surface shape, that is, a plate shape.

A passivation layer 180 is disposed on the data line 171 and the source and drain electrodes 173, and 175, the gate insulating layer 140, the exposed portion of the semiconductor 154, and the pixel electrode 191. However, in the liquid crystal display according to another exemplary embodiment of the present invention, the passivation layer 180 may be disposed between the pixel electrode 191 and the data line 171, and the pixel electrode 191 may be connected through a contact hole formed in the passivation layer 180 to the drain electrode 175.

The common electrode 270 is formed on the passivation layer 180. Common electrodes 270 are connected to each other to receive the reference voltage from the reference voltage application portion disposed outside of the display area.

The common electrode 270 includes a curved edge that is almost parallel to the first bent portion and the second bent portion of the data line 171, and the common electrodes 270 disposed in adjacent pixels are connected to each other. The common electrode 270 has a plurality of second cutouts 272, and includes a plurality of second branch electrodes 271 defined by the plurality of second cutouts 272.

Although not shown, an alignment layer may be coated on the common electrode 270 and the passivation layer 180, and the alignment layer may be a horizontal alignment layer and may be rubbed in a set or predetermined direction. However, according to another exemplary embodiment of the present invention, the alignment layer may include a photo-reactive material to be photo-aligned.

Next, the upper panel 200 will be described.

A light blocking member 220 is formed on an insulation substrate 210. A color filter 230 is formed on the insulation substrate 210. The color filter 230 may be disposed on the lower panel 100 and the light blocking member 220 may also be disposed on the lower panel 100.

An overcoat 250 is formed on the color filter 230 and the light blocking member 220. The overcoat 250 may be omitted.

The alignment layer may be disposed on the overcoat 250. The liquid crystal layer 3 includes a nematic liquid crystal material having positive dielectric anisotropy. Liquid crystal molecules of the liquid crystal layer 3 are arranged so that a long axis direction thereof is parallel to the display panels 100 and 200, and the liquid crystal molecules have a twisted spiral structure where an angle thereof is 90° from the rubbing direction of the alignment layer of the upper panel 200 to the lower panel 100.

A driving signal and a timing signal are applied to the data line and the gate line of a corresponding TFT in order to control the alignment angle and timing of the liquid crystal panel. To that end, the TCP 340 is provided in the liquid crystal panel 300 to determine application timing of the data driving signal and the gate driving signal.

The PCB 330 serving to receive an image signal from the outside of the liquid crystal panel 50 and to apply driving signals to the data line and the gate line is connected to the TCP 340 provided in the liquid crystal panel 300.

The PCB 330 serves to generate a data signal and a gate driving signal for driving the liquid crystal display, and a plurality of driving signals are provided for facilitating the application of the data signal and the gate driving signal with appropriate timing to respectively apply the data signal and the gate driving signal to the gate line and the data line of the liquid crystal panel 300 through the TCP 340.

Next, the accommodating unit 400 of the liquid crystal display according to the present exemplary embodiment will be described with reference to FIG. 1, FIG. 6, and FIG. 7.

Figure 6:
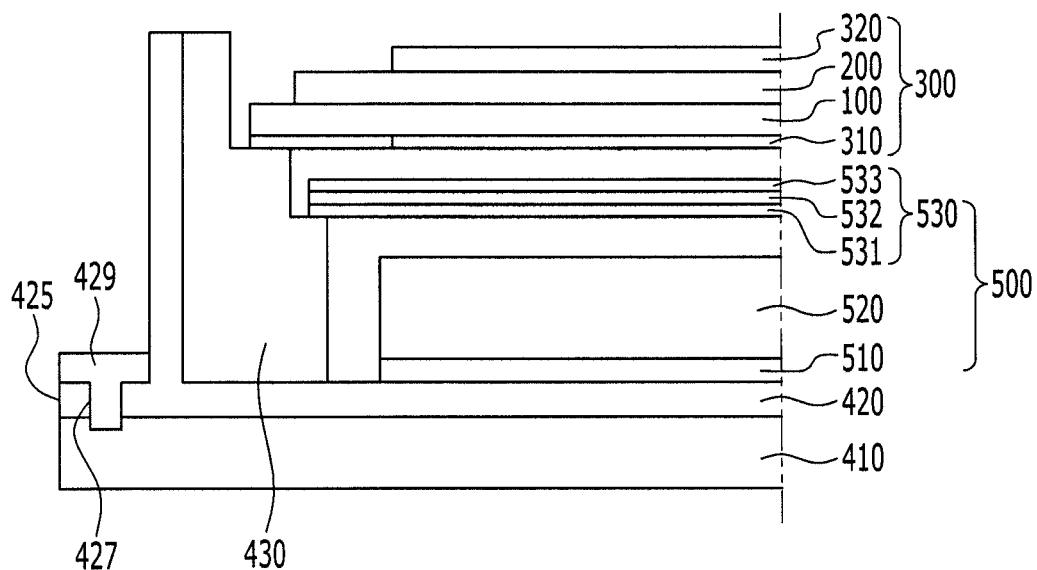
FIG. 6 is a cross-sectional view of the liquid crystal display of FIG. 4.

FIG. 6 is a cross-sectional view of the liquid crystal display of FIG. 4. FIG. 7 is a cross-sectional view of a liquid crystal display according to a comparative embodiment of the present invention, illustrating a cross-section of the same position as that of FIG. 6.

Referring to FIG. 1 and FIG. 6, the accommodating unit 400 of the present exemplary embodiment includes a bottom frame 410, a bottom chassis 420, and a mold frame 430.

The bottom chassis 420 includes an accommodator for accommodating the backlight unit 500 and the liquid crystal panel 300, and a flange 425 adhered to the bottom frame 410. In the present exemplary embodiment, the flange 425 of the bottom chassis 420 is formed at the same position as a bottom surface of the bottom chassis 420. A detailed shape of the flange 425 will be described later.

The backlight unit 500 and the liquid crystal panel 300 are accommodated in the accommodator, and may be secured thereto by the mold frame 430.

An inverter board serving as a power supply PCB and signal converting PCB are mounted on a rear surface of the bottom chassis 420. The inverter board serves to change external power to a uniform voltage level and transfer it to the light emitting diodes 540, and the signal converting PCB is connected to the aforementioned PCB 330 to convert an analog data signal into a digital data signal and transfer it to the liquid crystal panel.

As shown in FIG. 6, the mold frame 430 contacts a side surface of the bottom chassis 420, and has one end that is formed to have multiple steps (or levels). The steps support the liquid crystal panel 300 or the optical sheet 530. As a result, although having different sizes, the backlight unit 500 and the liquid crystal panel 300 can be stably secured in the bottom chassis 420.

The bottom frame 410 is disposed on a bottom surface of the bottom chassis 420, and serves as a plate for securing the bottom chassis 420. The bottom frame 410 serves to secure the bottom chassis 420, and also serves to disperse impacts applied to the bottom chassis 420. In FIG. 6, the bottom frame 410 is illustrated to have a plate-like shape. However, the bottom frame 410 may be integrally formed with a set bracket 440 to form a part of the set bracket. Alternatively, the set bracket may be provided without the bottom frame 410.

Figure 8:
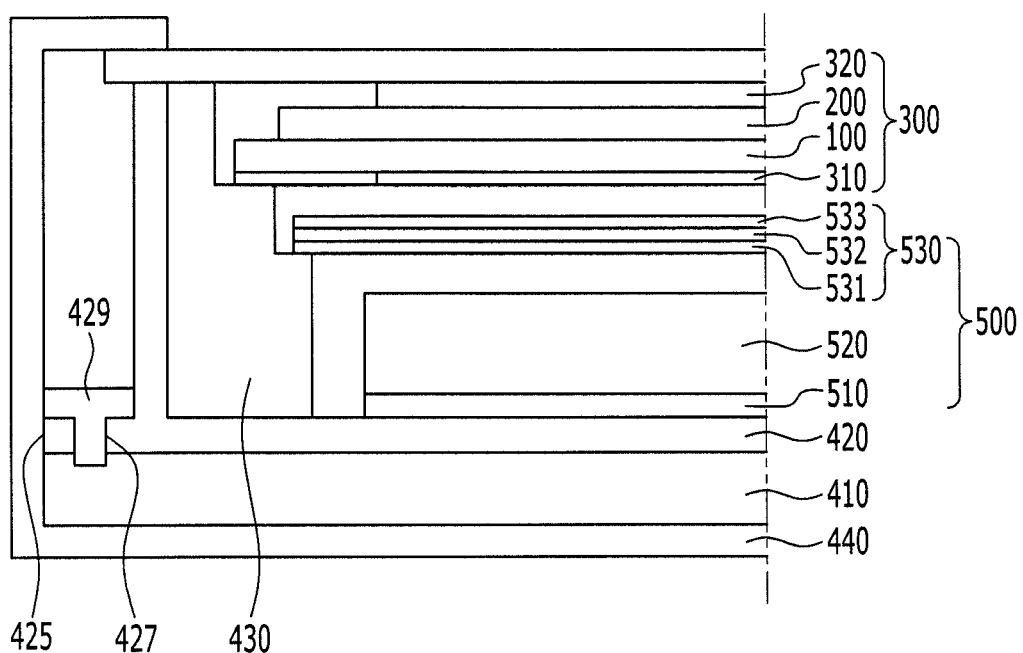
FIG. 8 illustrates a cross-section of a liquid crystal display according to an exemplary embodiment of the present invention.

FIG. 8 illustrating a cross-section of a liquid crystal display according to an exemplary embodiment of the present invention. The liquid crystal display shown in FIG. 8 includes a cover glass 350 disposed on the top of the liquid crystal panel 300, and the set bracket 440 configured to surround an outer peripheral portion of the liquid crystal display while securing the cover glass 350. In FIG. 8, the set bracket 440 and the bottom frame 410 are illustrated to be disposed. However, the set bracket 440 may be directly coupled to the bottom chassis 420 without the bottom frame 410.

Referring to FIG. 1, FIG. 6, and FIG. 8, in the liquid crystal display according to the exemplary embodiment of the present invention, the flange 425 of the bottom chassis 420 is disposed at (e.g., on) the bottom side (surface) of the bottom chassis 420 (i.e., the flange 425 is disposed or formed at the same position as a bottom surface of the bottom chassis 420). The flange 425 is a part that is protruded to secure the bottom chassis 420 to the bottom frame 410 or the set bracket 440. In the present exemplary embodiment, the bottom chassis 420 and the flange 425 may be integrally formed (e.g., integrally provided as one continuous body) to be connected with each other. Typically, in the liquid crystal display according to the comparative embodiment, the flange 425 is disposed at an upper side (surface) of the bottom chassis 420.

However, in the liquid crystal display according to the present exemplary embodiment, the flange 425 of the bottom chassis 420 is disposed at the bottom surface of the bottom chassis 420. As shown in FIG. 1, FIG. 6, FIG. 8, a hole 427 is formed in the flange 425 to be coupled to another part, and a coupling member 429 such as a screw is used (utilized) to couple the bottom chassis 420 to the bottom frame 410.

Figure 7:
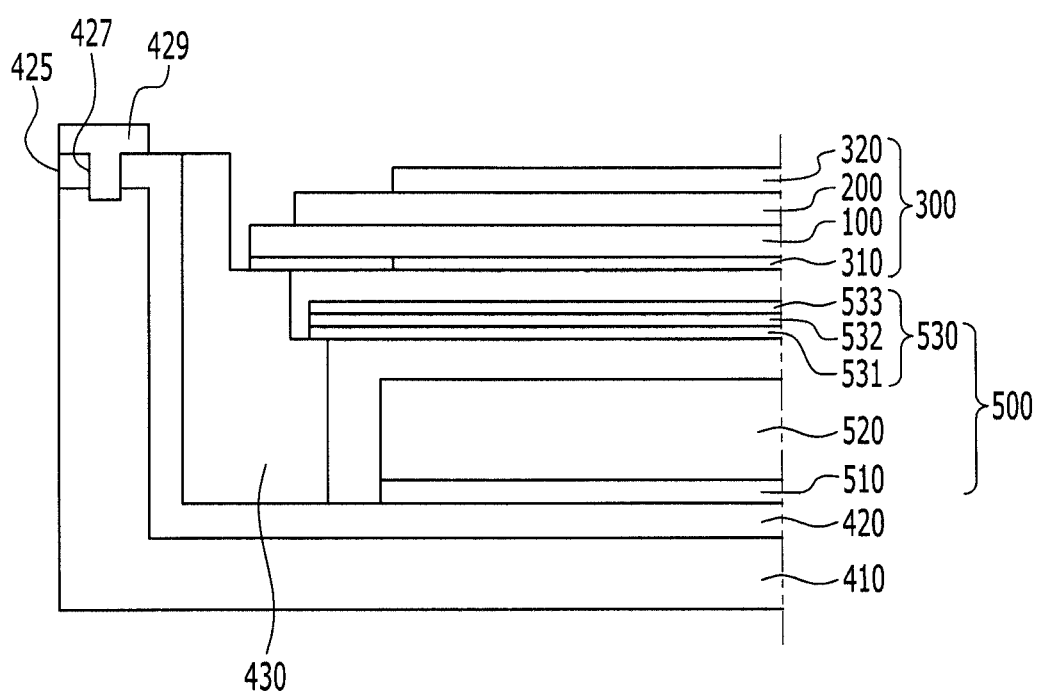
FIG. 7 is a cross-sectional view of a liquid crystal display according to a comparative embodiment of the present invention, illustrating a cross-section of the same position as that of FIG. 6.
Figure 9:
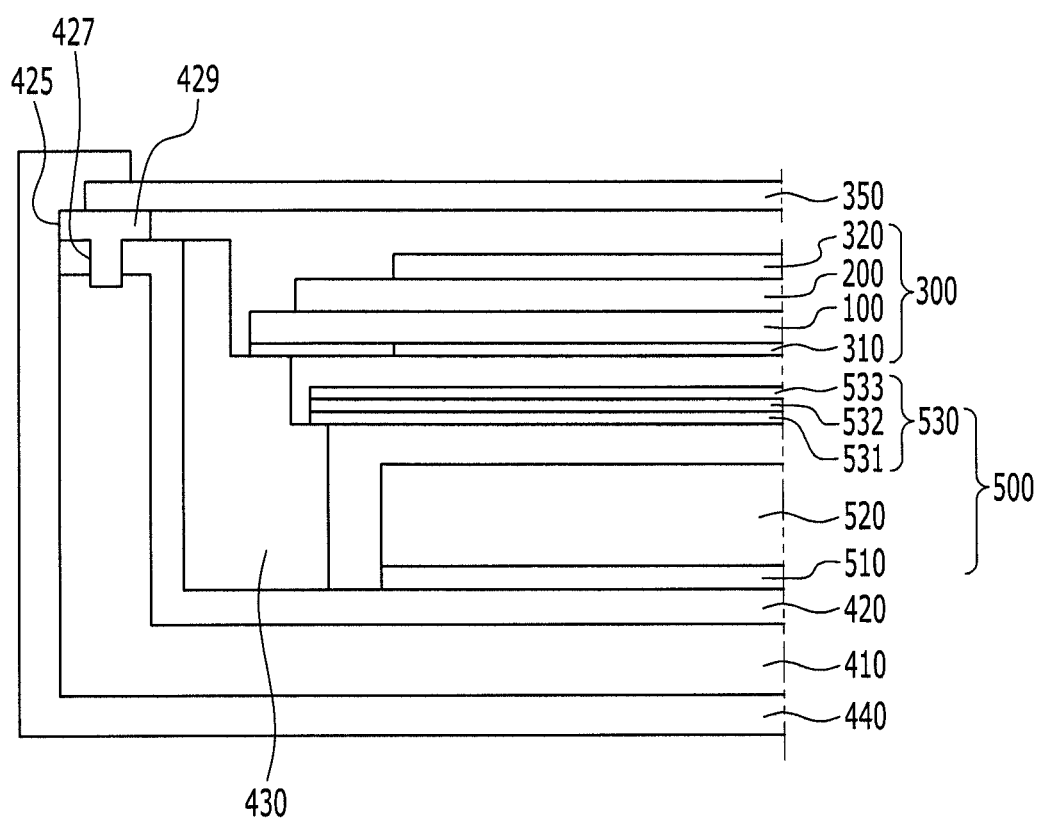
FIG. 9 is a cross-sectional view of a liquid crystal display according to a comparative embodiment of the present invention, illustrating a cross-section of the same position as that of FIG. 8.

FIG. 7 and FIG. 9 illustrate liquid crystal displays according to comparative embodiments of the present invention. FIG. 7 illustrates a cross-section of the liquid crystal display not including a set bracket or a cover glass, while FIG. 9 illustrates a cross-section of the liquid crystal display including the set bracket 440 and the cover glass 350. Referring to FIG. 7 and FIG. 9, in the liquid crystal displays according to the comparative embodiments, the flange 425 of the bottom chassis 420 is disposed on the top of the bottom chassis 420. Accordingly, as shown in FIG. 7 and FIG. 9, the bottom frame 410 is extended to an upper portion of the liquid crystal display to be coupled with the flange 425 at the upper portion of the liquid crystal display, i.e., in the vicinity of the liquid crystal panel 300.

As a result, in the liquid crystal displays according to the comparative embodiments, the flange 425 of the bottom chassis 420 is disposed in the vicinity of the liquid crystal panel 300. Accordingly, a pressure applied when the flange 425 is coupled to the bottom frame 410 or the set bracket 440 through the coupling member 429 is transferred to the liquid crystal panel as it is. In other words, stress is inevitably applied when the bottom chassis 420 is coupled to another constituent element through the coupling member 429, and this stress has an influence on the liquid crystal panel disposed in the vicinity of the flange 425.

When the stress is applied to the liquid crystal panel, an azimuth angle of the liquid crystal may be changed by a thus-applied pressure due to liquid crystal arrangement, thereby generating light leakage.

Figure 10:
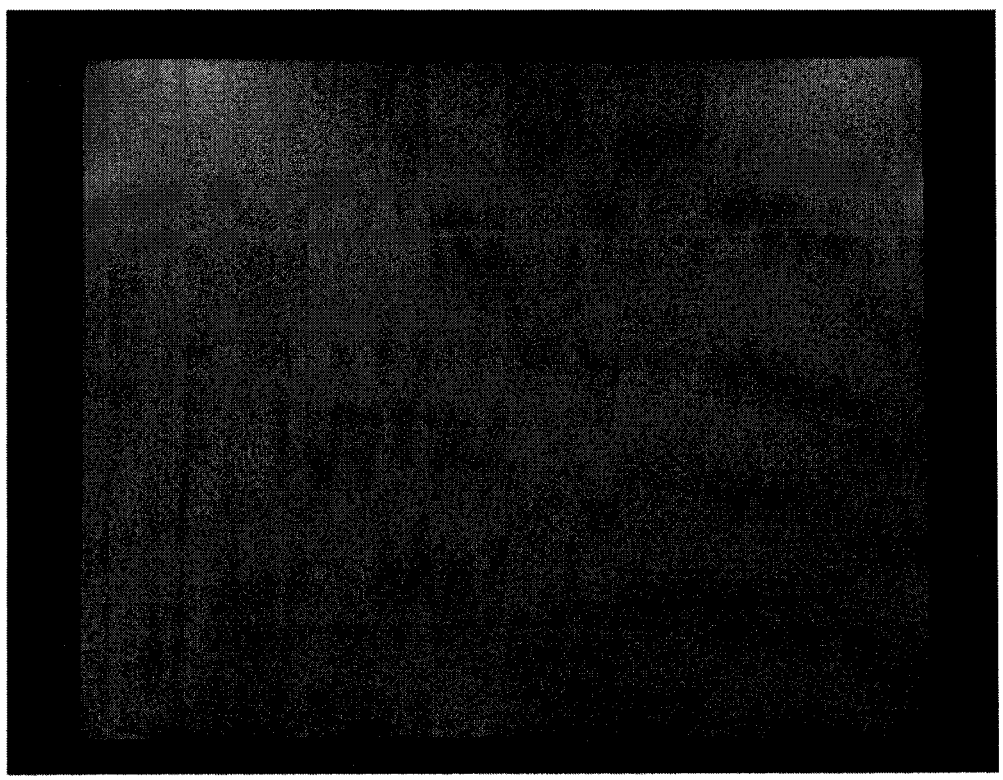
FIG. 10 is an image of a panel having white light leakage caused by compression.
Figure 11:
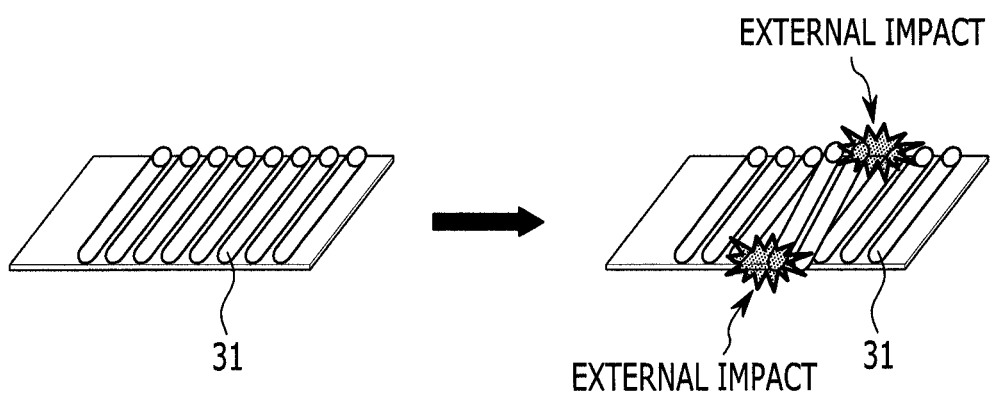
FIG. 11 illustrates how white light leakage is generated due to compression.

FIG. 10 illustrates a panel having white light leakage caused by compression at edges thereof by a pressure that is applied when the flange 425 of the bottom chassis 420 is coupled thereto in the comparative embodiments. FIG. 11 illustrates how white light leakage is generated due to compression.

Referring to FIG. 10, it is seen that light leakage is generated from the edges of the panel at which the flange 425 of the bottom chassis 420 is disposed. This is because, as shown in FIG. 11, when a pressure is applied to liquid crystal molecules 31 that are aligned in a direction, the direction in which the liquid crystal molecules 31 are aligned is changed so that a refractive index of a region at which the alignment of the liquid crystal molecules 31 is broken is changed, thereby generating light leakage.

However, in the liquid crystal displays according to the exemplary embodiments of the present invention, the flange 425 is disposed at the bottom surface of the bottom chassis 420 so that a position at which the bottom chassis 420 is coupled with another constituent element is spaced (or distant) from the liquid crystal panel 300. As a result, in the liquid crystal displays according to the exemplary embodiments of the present invention, the stress that is applied when the bottom chassis 420 is coupled with the bottom frame 410 or the set bracket 440 is not transferred to the liquid crystal panel 300. Accordingly, it is possible to prevent or reduce the light leakage of the liquid crystal panel caused by the transmission of the stress.

Figure 12:
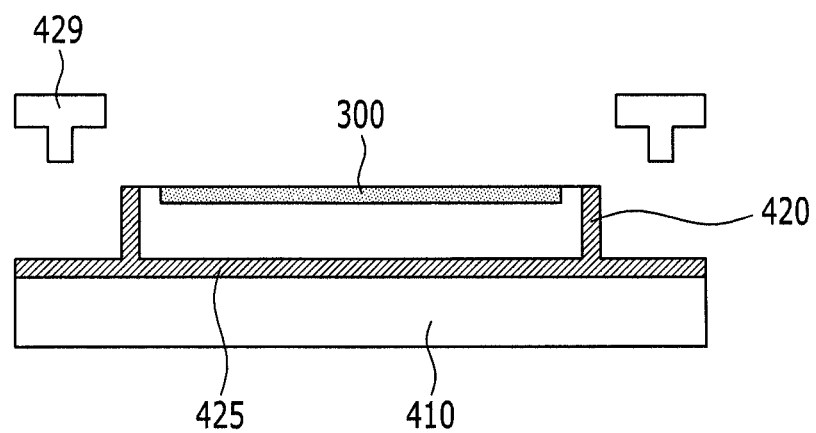
FIG. 12 illustrates how a bottom chassis and a set bracket are coupled with each other according to an exemplary embodiment of the present invention.
Figure 12:
Figure 12:
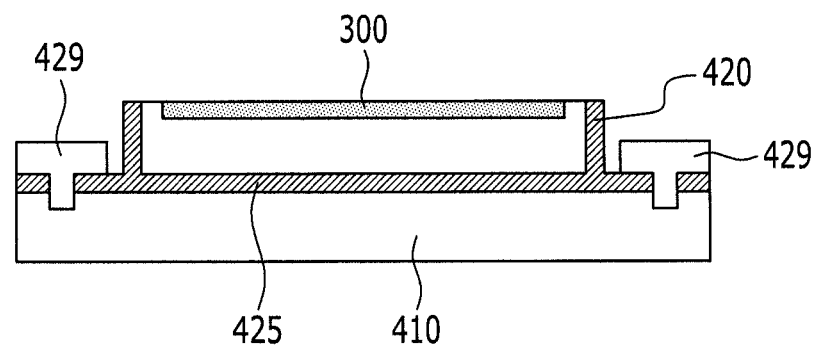
Figure 13:
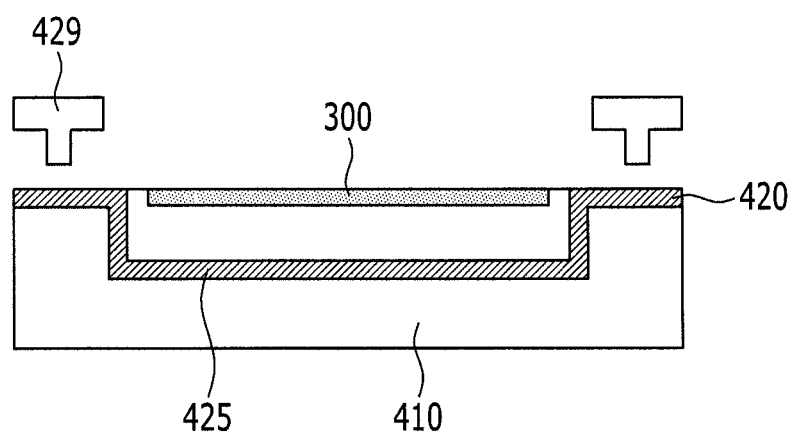
FIG. 13 illustrates how a bottom chassis and a set bracket are coupled with each other according to a comparative embodiment of the present invention.
Figure 13:
Figure 13:
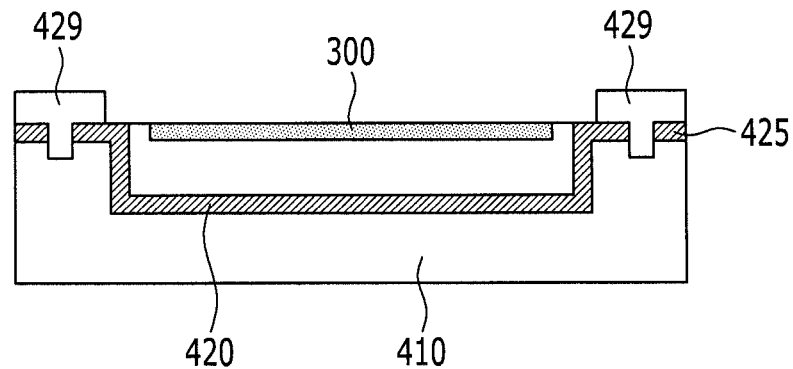

FIG. 12 illustrates how the bottom chassis 420 and the set bracket 440 are coupled with each other according to the exemplary embodiments of the present invention, while FIG. 13 illustrates how the bottom chassis 420 and the set bracket 440 are coupled with each other according to the comparative embodiments of the present invention.

Referring to FIG. 12, in the liquid crystal displays according to the exemplary embodiments of the present invention, the bottom chassis 420 is coupled with the set bracket 440 (or the bottom frame 410) at a position that is distant from the liquid crystal panel 300. Accordingly, the stress caused by the pressure applied when the bottom chassis 420 is coupled with the set bracket 440 (or the bottom frame 410) is substantially not or hardly transferred to the liquid crystal panel 300. As shown in FIG. 12, the stress is substantially or mainly applied to a lower portion of the liquid crystal panel 300.

However, referring to FIG. 13, in the liquid crystal displays in which the flange 425 of the bottom chassis 420 is above the bottom chassis 420 according to the comparative embodiments of the present invention, the stress that is applied when the bottom chassis 420 is coupled to the bottom frame 410 is transferred to the liquid crystal panel 300 as it is. Accordingly, as shown in FIG. 10 and FIG. 11, light leakage caused by compression is generated at a region at which the flange 425 is formed.

Figure 14:
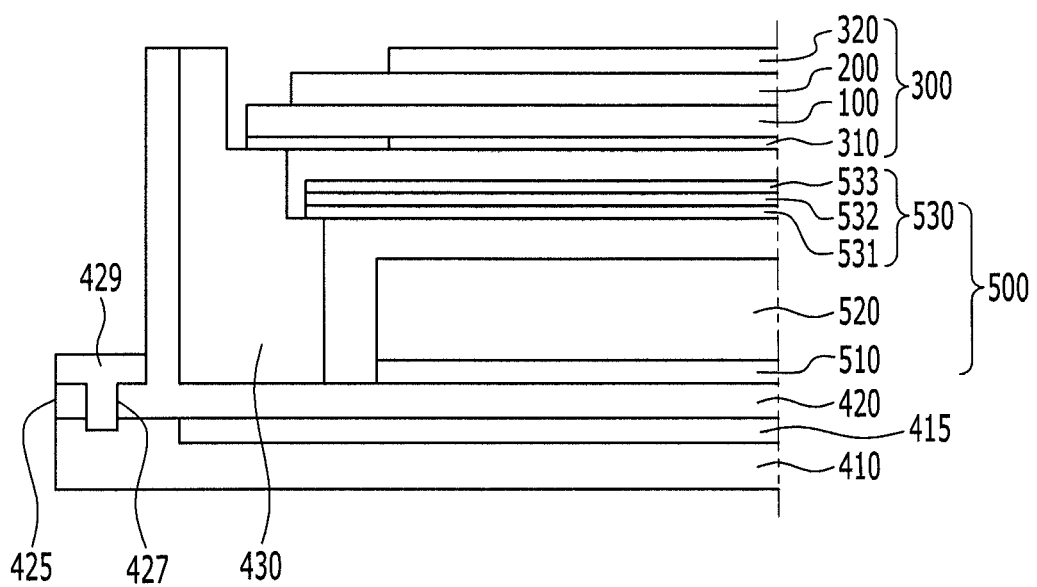
FIG. 14 is a cross-sectional view of a liquid crystal display according to an exemplary embodiment of the present invention, illustrating a cross-section of the same position as that of FIG. 6.

Next, a liquid crystal display according to an exemplary embodiment of the present invention will be described with reference to FIG. 14. FIG. 14 is a cross-sectional view of the liquid crystal display according to the exemplary embodiment of the present invention, illustrating a cross-section of the same position as that of FIG. 6. Most of the constituent elements of the liquid crystal display of the present exemplary embodiment are similar to those of the exemplary embodiment shown in FIG. 6. Detailed description of the similar constituent elements will be omitted.

However, as shown in FIG. 14, in the liquid crystal display of the present exemplary embodiment, a groove 415 is formed at a portion of the bottom frame 410 to correspond to the accommodator of the bottom chassis 420. The groove 415 formed in the bottom frame 410 serves to absorb stress caused by a processing error generated when the flange 425 is formed.

When the bottom chassis 420 and the flange 425 are formed, it is not easy to exactly form an angle between the flange 425 and a side surface of the bottom chassis 420 at 90°. A mechanical error is inevitably generated, and in this case, the processing angle error range is about ±3°. This processing error causes a gap to be inevitably formed when the bottom chassis 420 and the bottom frame 410 are coupled with each other. This gap is removed by the action of a pressure that is applied when the bottom chassis 420 and the bottom frame 410 are coupled with each other. However, this applied pressure is transferred to the liquid crystal panel 300.

Figure 15:
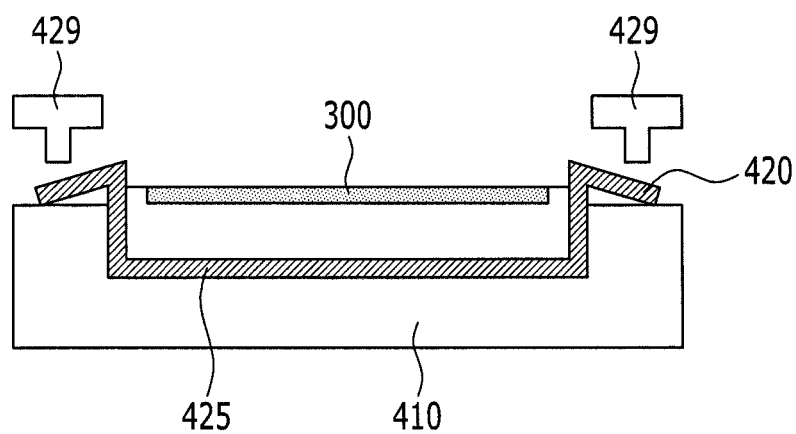
FIG. 15 illustrates how stress is generated when a flange having a processing error is coupled to a liquid crystal display according to a comparative embodiment of the present invention.
Figure 15:
Figure 15:
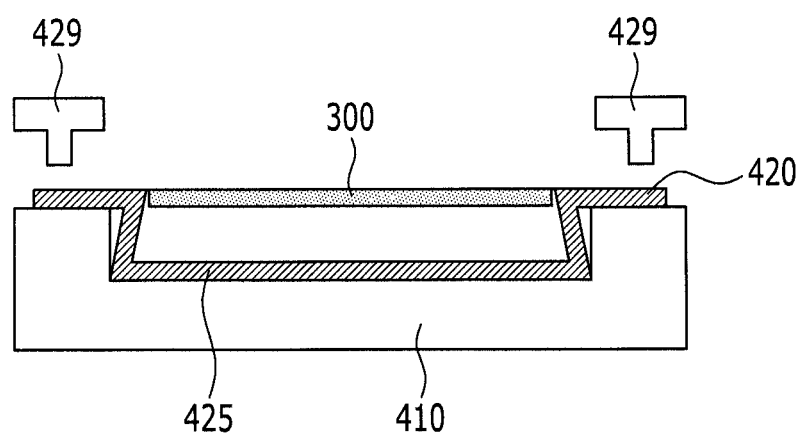

FIG. 15 illustrates how a stress is generated when a flange having a processing error is coupled to a liquid crystal display according to a comparative embodiment of the present invention. Referring to FIG. 15, a gap formed on a contact portion between the flange 425 and the bottom frame 410 is removed by the action of the pressure that is applied when the flange 425 and the bottom frame 410 are coupled to each other. However, a stress generated in this process is transferred to the liquid crystal panel 300 as it is. This may cause light leakage of the liquid crystal panel 300.

Figure 16:
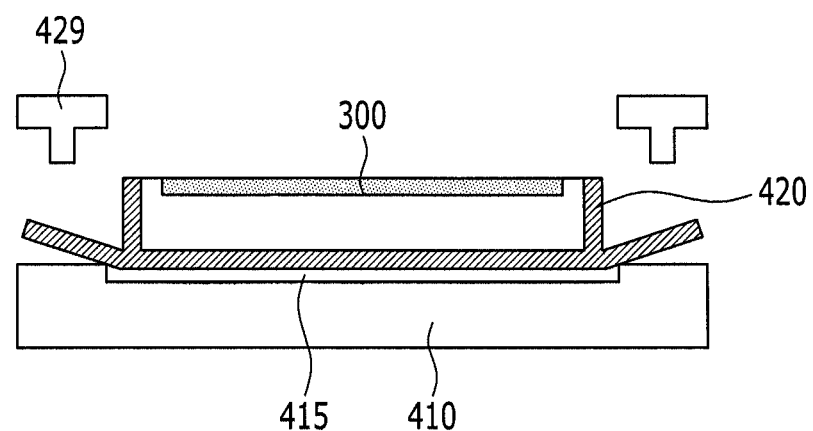
FIG. 16 illustrates how stress is generated when a flange having a processing error is coupled to a liquid crystal display according to an exemplary embodiment of the present invention.
Figure 16:
Figure 16:
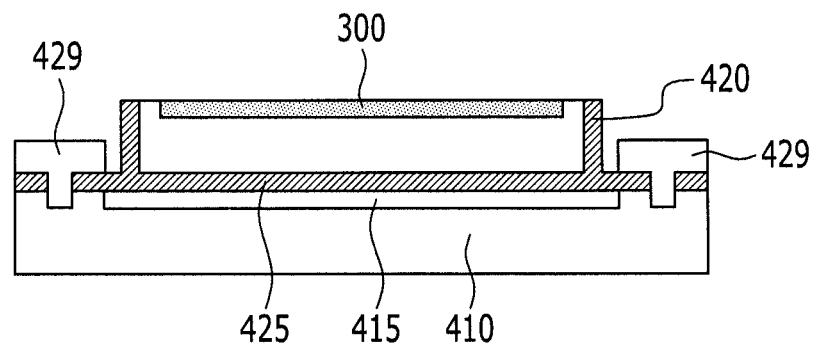

FIG. 16 illustrates how stress is generated when a flange having a processing error is coupled to a liquid crystal display according to an exemplary embodiment of the present invention. Referring to FIG. 6, the gap formed on the contact portion between the flange 425 and the bottom frame 410 by the processing error is removed when the flange 425 and the bottom frame 410 are coupled with each other by using (utilizing) the coupling member 429. In this case, the groove 415 formed at a lower portion of the bottom frame 410 serves to buffer the stress caused in the process in which the gap is removed. Accordingly, the stress caused when the flange 425 and the bottom frame 410 are coupled with each other is not transferred to the inside of the accommodator of the bottom chassis 420.

Figure 17:
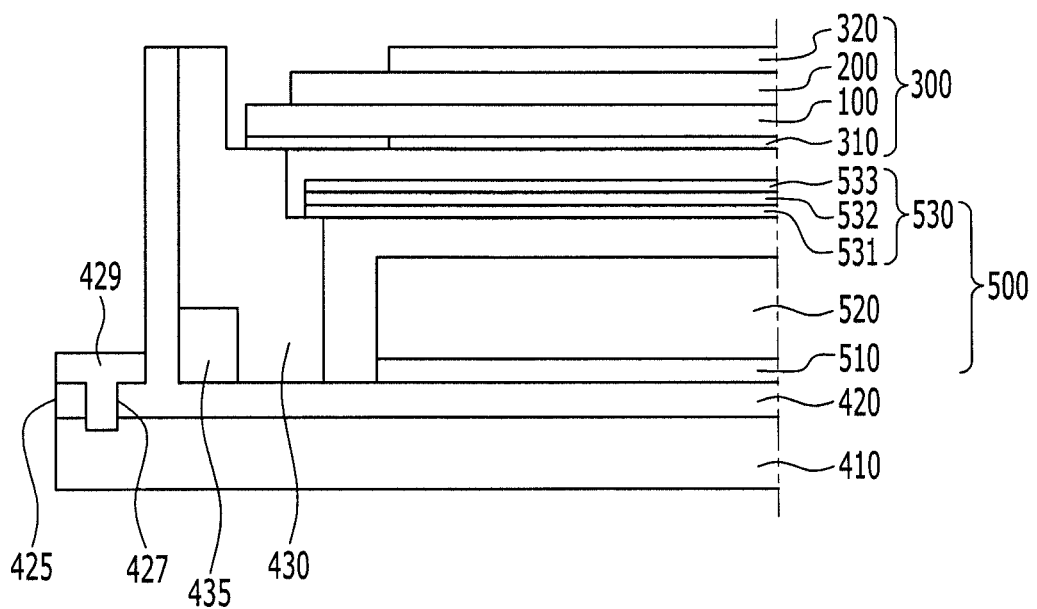
FIG. 17 is a cross-sectional view of a liquid crystal display according to an exemplary embodiment of the present invention, illustrating a cross-section of the same position as that of FIG. 6.

Next, a liquid crystal display according to an exemplary embodiment of the present invention will be described with reference to FIG. 17 to FIG. 19. FIG. 17 is a cross-sectional view of the liquid crystal display according to the exemplary embodiment of the present invention, illustrating a cross-section of the same position as that of FIG. 6, and most of the constituent elements of the liquid crystal display of the present exemplary embodiment are similar to those of the exemplary embodiment shown in FIG. 6. Detailed description of the similar constituent elements will be omitted.

Referring to FIG. 17, in the liquid crystal display of the present exemplary embodiment, an empty space 435 is formed by partially removing the mold frame 430 at one side of the liquid crystal display of the present exemplary embodiment at which the mold frame 430 and bottom chassis 420 contact each other. The empty space 435 may be formed at a portion that is adjacent to the flange 425 of the bottom chassis 420. This empty space 435 serves to buffer the stress caused by the pressure applied when the bottom chassis 420 and the bottom frame 410 are coupled with each other to prevent or reduce the stress from being transferred to the inside of the accommodator of the bottom chassis 420. When the bottom chassis 420 and the mold frame 430 entirely contact each other without forming an additional empty space at the mold frame 430, the stress that is transferred to the bottom chassis 420 may be transferred to the mold frame 430 as it is. Since the mold frame 430 also contacts the liquid crystal panel 300, there is a possibility for the stress to be transferred to the liquid crystal panel 300. However, as in the present exemplary embodiment, the empty space 435 serves to absorb and buffer the stress applied to the bottom chassis 420 as the empty space 435 is formed by removing a portion of the mold frame 430 near the flange 425 of the bottom chassis 420. As a result, the stress applied to the bottom chassis 420 can be prevented or blocked from being transferred to the mold frame 430 etc. The flange 425 may include a plurality of flanges 425. In this case, the empty space 435 may be formed at the portion of the mold frame 430 near the flange 425 of the bottom chassis 420 to have a quadrangular shape, and may have a plurality of empty spaces 435 of which the number is the same as that of the flanges 425. For example, when one liquid crystal display includes four flanges 425, four empty spaces 435 may be formed in the mold frame 430.

Figure 18:
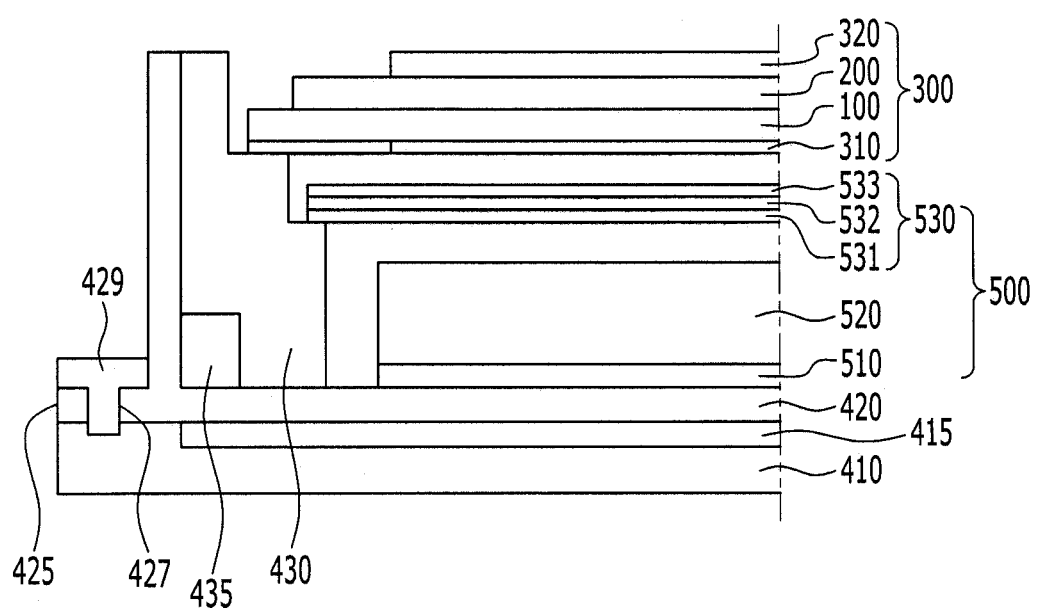
FIG. 18 is a cross-sectional view of the liquid crystal display according to an exemplary embodiment of the present invention, illustrating a cross-section of the same position as that of FIG. 17.

FIG. 18 is a cross-sectional view of the liquid crystal display according to an exemplary embodiment of the present invention, illustrating a cross-section of the same position as that of FIG. 17. Most of the constituent elements of the liquid crystal display according to the exemplary embodiment shown in FIG. 18 are similar to those of the exemplary embodiment shown in FIG. 17. Detailed description of the similar constituent elements will be omitted.

Referring to FIG. 18, in the liquid crystal display of the present exemplary embodiment, the empty space 435 is formed at the mold frame 430, and the groove 415 is formed at the bottom frame 410. Accordingly, the stress that is generated when the bottom chassis 420 is coupled with the bottom frame 410 or the set bracket 440 is buffered and absorbed through the empty space 435 of the mold frame 430 and the groove 415 of the bottom frame 410. As a result, it is possible to more efficiently prevent or reduce the light leakage caused by compression in the liquid crystal panel due to the stress that is applied when the bottom chassis 420 is coupled with the bottom frame 410 or the set bracket 440.

Figure 19:
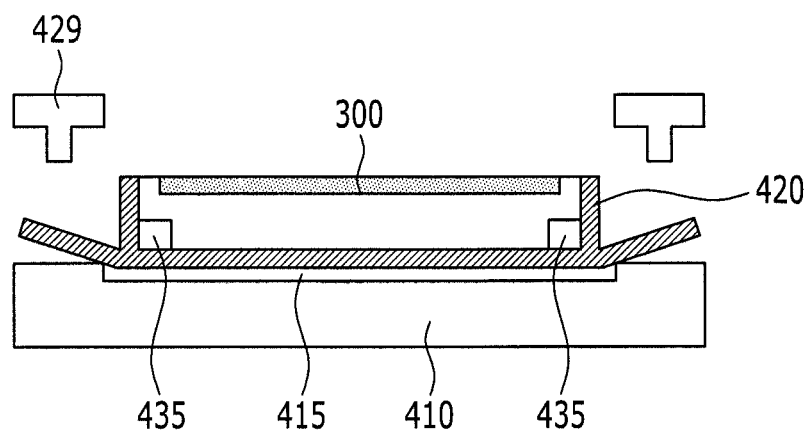
FIG. 19 illustrates a coupling process of the liquid crystal display according to the present exemplary embodiment.
Figure 19:
Figure 19:
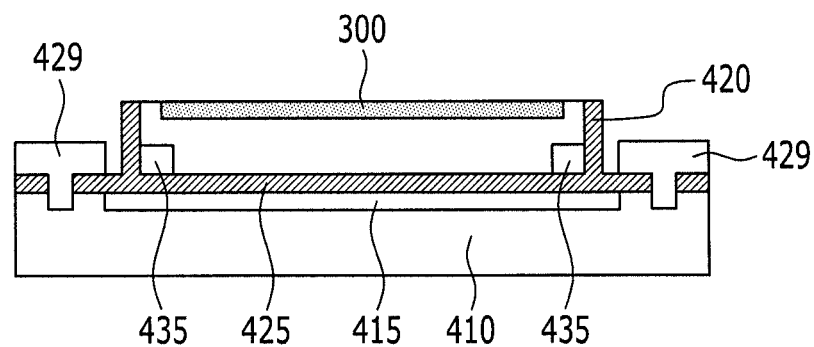

FIG. 19 illustrates a coupling process of the liquid crystal display according to the present exemplary embodiment. Referring to FIG. 19, the gap formed by the processing error of the flange 425 of the bottom chassis 420 is removed in the coupling process. In this case, the stress that is applied to the inside of the bottom chassis 420 is buffered and absorbed through the empty space 435 of the mold frame 430 and the groove 415 of the bottom frame 410.

Figure 20:
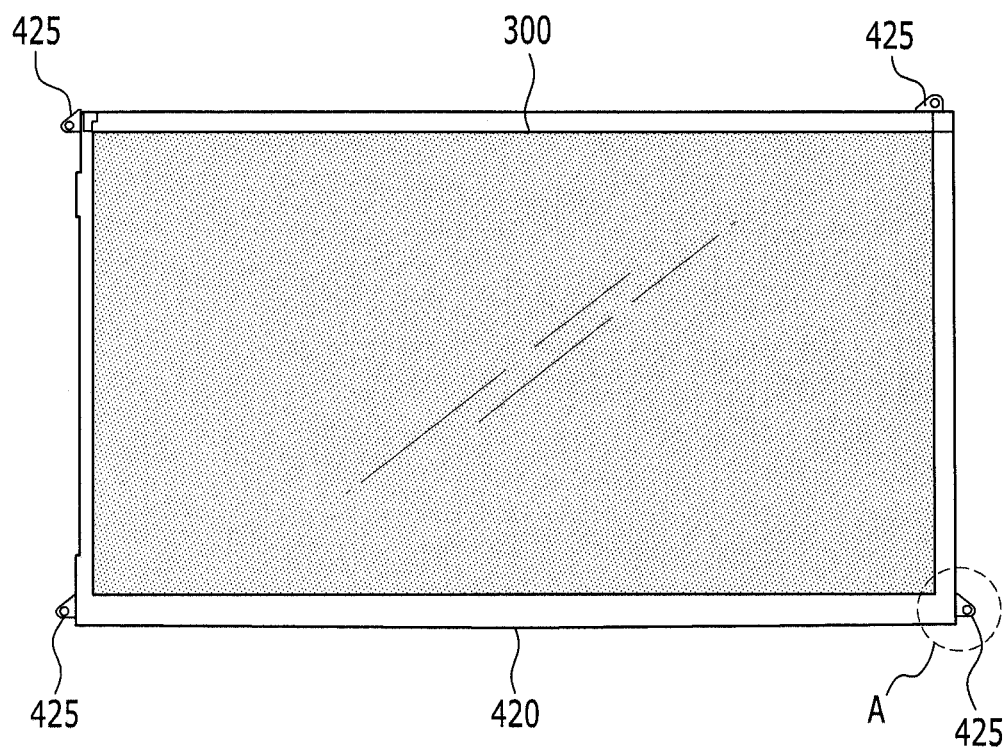
FIG. 20 schematically illustrates a front surface of a liquid crystal display according to an exemplary embodiment of the present invention.

FIG. 20 schematically illustrates a front surface of a liquid crystal display according to an exemplary embodiment of the present invention. Referring to FIG. 20, the flange 425 of the bottom chassis 420 may be disposed at each edge of the liquid crystal panel 300. For example, in FIG. 20, a total of four flanges 425 are formed at each edge, but the number and position of the flanges 425 may be varied.

Figure 21:
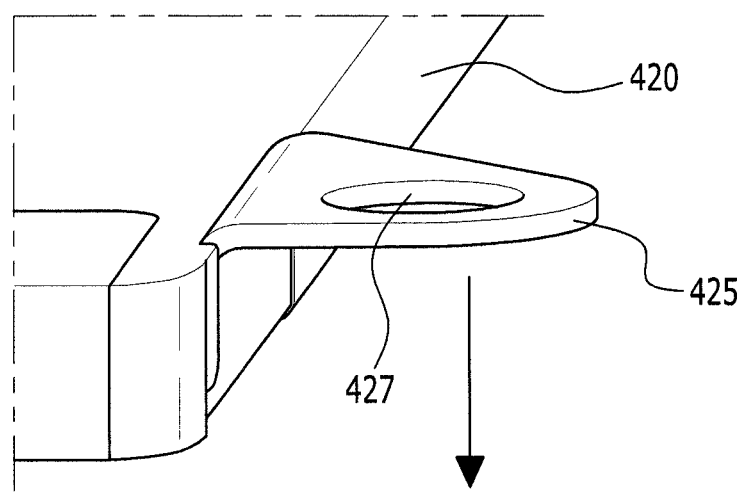
Figure 22:
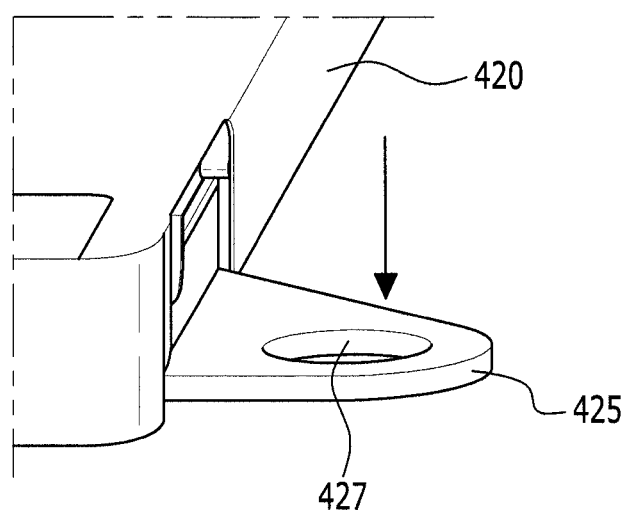

FIG. 21 and FIG. 22 are enlarged views respectively illustrating a portion indicated by "A" in FIG. 20, and specifically FIG. 21 illustrates the flange 425 of the liquid crystal panel 300 according to a comparative embodiment of the present invention, and FIG. 22 illustrates the flange 425 of the liquid crystal panel 300 according to an exemplary embodiment of the present invention.

Referring to FIG. 21, the flange 425 is disposed at an upper portion of the liquid crystal display according to the comparative embodiment of the present invention. Accordingly, a pressure indicated by an arrow shown in FIG. 21 is applied to the liquid crystal display in the coupling process and is transferred to the liquid crystal panel 300 thereof, generating the light leakage caused by compression.

However, referring to FIG. 22, the flange 425 is disposed at a lower portion of the bottom chassis 420 in the liquid crystal display according to the exemplary embodiment of the present invention. A pressure indicated by an arrow shown in FIG. 22 is applied to the liquid crystal display in the coupling process. In this case, the coupled portion is separated from the liquid crystal panel 300, thereby preventing or reducing the generation of the light leakage caused by compression.

While this invention has been described in connection with what is presently considered to be practical exemplary embodiments, it is to be understood that the invention is not limited to the disclosed embodiments, but, on the contrary, is

| Description of Symbols | |
| --- | --- |
| 100: lower panel | 200: upper panel |
| 121: gate line | 124: gate electrode |
| 140: gate insulating layer | 154: semiconductor |
| 171: data line | 180: passivation layer |
| 191: pixel electrode | 110, 210: insulation substrate |
| 230: color filter | 250: overcoat |
| 270: common electrode | 300: liquid crystal panel |
| 330: PCB | 340: TCP |
| 400: accommodating unit | 410: bottom frame |
| 415: groove | 420: bottom chassis |
| 425: flange | 427: hole |
| 429: coupling member | 430: mold frame |
| 435: empty space | 440: set bracket |
| 500: backlight unit | 510: reflective sheet |
| 520: light guide | 530: optical sheet |
| 531: diffuser sheet | 532: light collecting sheet |
| 533: protecting sheet | |

What is claimed is:

1. A liquid crystal display comprising:
a liquid crystal panel configured to display an image;
a light unit configured to supply light to the liquid crystal panel; and
a bottom chassis configured to accommodate the light unit and the liquid crystal panel,
the bottom chassis comprising:
an accommodator configured to accommodate the light unit and the liquid crystal panel, and
a flange outside the accommodator,
the flange being at the same position as a bottom surface of the bottom chassis.

2. The liquid crystal display of claim 1, wherein the flange and the accommodator of the bottom chassis are formed by utilizing a single process, and are connected to each other without being separated from each other.

3. The liquid crystal display of claim 1, wherein the bottom chassis has a quadrangular shape, and the flange is formed at each edge of the bottom chassis.

4. The liquid crystal display of claim 3, wherein the flange comprises four flanges in the liquid crystal display.

5. The liquid crystal display of claim 1, further comprising a bottom frame or a set bracket configured to be coupled with the bottom chassis,
wherein the flange is coupled with the bottom frame or the set bracket of the liquid crystal display.

6. The liquid crystal display of claim 5, wherein a groove is provided at a portion of the bottom frame to correspond to the accommodator of the bottom chassis, and
a thickness of the bottom frame at the accommodator of the bottom chassis is lower than a thickness of the bottom frame at the flange of the bottom chassis.

7. The liquid crystal display of claim 5, wherein a groove is provided at a portion of the set bracket to correspond to the accommodator of the bottom chassis, and
a thickness of the set bracket at the accommodator of the bottom chassis is lower than a thickness of the set bracket at the flange of the bottom chassis.

8. The liquid crystal display of claim 5, wherein a groove is provided at a portion of the bottom frame or the set bracket to correspond to the accommodator of the bottom chassis, and
a thickness of the bottom frame or the set bracket at the accommodator of the bottom chassis is lower than a thickness of the bottom frame or the set bracket at the flange of the bottom chassis, and
wherein the groove has the same shape as that of the liquid crystal panel.

9. The liquid crystal display of claim 8, wherein the groove has a quadrangular shape.

10. The liquid crystal display of claim 1, further comprising
a mold frame in the inside of the accommodator of the bottom chassis.

11. The liquid crystal display of claim 10, wherein an empty space is provided by removing a portion of the mold frame near to the flange of the bottom chassis.

12. The liquid crystal display of claim 11, wherein the empty space has a quadrangular shape.

13. The liquid crystal display of claim 11, wherein the number of empty spaces formed by partially removing the mold frame is the same as the number of flanges.

14. The liquid crystal display of claim 1, wherein a coupling hole is formed at the center of the flange.

15. The liquid crystal display of claim 1, wherein the liquid crystal panel includes:
an insulating substrate;
a gate line on the insulating substrate; and
a plurality of pixels on the insulating substrate and comprising a first field generating electrode and a second field generating electrode overlapping with an insulating layer interposed therebetween,
wherein one of the first field generating electrode and the second field generating electrode has a plurality of cutouts,
the plurality of cutouts comprises a first portion forming a first angle with a reference line forming an angle of 90° with the gate line and a second portion forming a second angle that is different from the first angle with the reference line, and
a ratio of a length of the first portion to a length of the cutout is about 80% or more.

16. The liquid crystal display of claim 15, wherein a ratio of a length of the second portion to the length of the cutout is about 6% to about 13%.

17. The liquid crystal display of claim 15, wherein the other one of the first field generating electrode and the second field generating electrode has a flat surface plate shape.

18. The liquid crystal display of claim 15, wherein the second angle is larger than the first angle.

19. The liquid crystal display of claim 18, wherein
the cutout further comprises a third portion forming a third angle that is different from the first angle with the reference line, and
a ratio of the length of the third portion to the length of the cutout is about 10% or less.

20. The liquid crystal display of claim 19, wherein the third angle is larger than the first angle.

* * * * *